(12) United States Patent
Gandhi

(10) Patent No.: US 10,577,474 B2
(45) Date of Patent: Mar. 3, 2020

(54) REHEATABLE AND WASHPROOF CONTAINER WITH INSULATION PROPERTIES

(71) Applicant: HAMILTON HOUSEWARES PVT. LTD., Mumbai (IN)

(72) Inventor: Rajesh Gandhi, Mumbai (IN)

(73) Assignee: HAMILTON HOUSEWARES PVT. LTD., Mumbai (IN)

( * ) Notice: Subject to any disclaimer, the term of this patent is extended or adjusted under 35 U.S.C. 154(b) by 254 days.

(21) Appl. No.: 15/673,009

(22) Filed: Aug. 9, 2017

(65) Prior Publication Data
US 2018/0044499 A1 Feb. 15, 2018

(30) Foreign Application Priority Data
Aug. 9, 2016 (IN) .............................. 201621027239

(51) Int. Cl.
*B65D 81/38* (2006.01)
*A47J 41/00* (2006.01)
(Continued)

(52) U.S. Cl.
CPC .............. *C08K 3/18* (2013.01); *B23K 20/023* (2013.01); *B29C 65/02* (2013.01);
(Continued)

(58) Field of Classification Search
CPC .... A47G 19/027; A47G 19/12; A47G 19/127; A47G 19/14; A47G 19/00; A47G 19/2288; A47G 23/04; A47J 36/28; A47J 39/00; A47J 39/02; A47J 39/025; A47J 41/02; A47J 41/028; A47J 41/0044; A47J 41/0077; A47J 41/0072; B23K 20/12–1215; B23K 20/023; B29C 65/00; B29C 65/06; B29C 65/0672; B29C 65/02; B29C 65/023; B29C 66/54; B29C 66/71; B29C 66/74;
(Continued)

(56) References Cited

U.S. PATENT DOCUMENTS

| 608,684 | A | * | 8/1898 | Kahn | ...................... | A47J 39/00 |
| | | | | | | 220/592.22 |
| 850,143 | A | * | 4/1907 | Donnelly | ................ | A47J 36/02 |
| | | | | | | 220/573.1 |

(Continued)

*Primary Examiner* — Gideon R Weinerth
(74) *Attorney, Agent, or Firm* — Hoglund & Pamias, PSC; Roberto J. Rios

(57) ABSTRACT

The various embodiments herein provide an insulated container. The container comprises a body assembly and a lid assembly. The body assembly comprises of an outer plastic body and a plastic ring insert molded with an inner stainless steel (SS) container. The inner SS container has a non-woven polyester fabric acting as an insulation material. The non-woven polyester fabric is enclosed in between the outer plastic body and the inner SS container. The lid assembly comprises of a plastic top lid, an inner lid and a bowl with non-woven polyester fabric acting as insulation. The polyester fabric is sandwiched between the plastic top lid, the inner lid and the bowl. In the body assembly, the outer plastic body and the inner plastic ring is joined together using a spin welding technique. In the lid assembly the top lid, inner lid and bowl are joined together using spin welding technique.

9 Claims, 5 Drawing Sheets

(51) Int. Cl.

| | |
|---|---|
| *B23K 20/12* | (2006.01) |
| *C08K 3/18* | (2006.01) |
| *B29C 65/00* | (2006.01) |
| *C08K 3/26* | (2006.01) |
| *B32B 3/06* | (2006.01) |
| *B32B 3/30* | (2006.01) |
| *B32B 27/12* | (2006.01) |
| *B32B 27/32* | (2006.01) |
| *B32B 15/18* | (2006.01) |
| *B29C 65/02* | (2006.01) |
| *B29C 65/06* | (2006.01) |
| *B32B 27/20* | (2006.01) |
| *B32B 7/08* | (2019.01) |
| *B32B 5/02* | (2006.01) |
| *B32B 15/14* | (2006.01) |
| *B23K 20/02* | (2006.01) |
| *B32B 15/09* | (2006.01) |
| *B32B 27/02* | (2006.01) |
| *B32B 27/28* | (2006.01) |
| *B29L 31/00* | (2006.01) |
| *C08K 3/22* | (2006.01) |

(52) U.S. Cl.
CPC ...... *B29C 65/0672* (2013.01); *B29C 66/0242* (2013.01); *B29C 66/12441* (2013.01); *B29C 66/12445* (2013.01); *B29C 66/131* (2013.01); *B29C 66/5344* (2013.01); *B29C 66/54* (2013.01); *B29C 66/71* (2013.01); *B29C 66/73921* (2013.01); *B32B 3/06* (2013.01); *B32B 3/30* (2013.01); *B32B 5/022* (2013.01); *B32B 7/08* (2013.01); *B32B 15/09* (2013.01); *B32B 15/14* (2013.01); *B32B 15/18* (2013.01); *B32B 27/02* (2013.01); *B32B 27/12* (2013.01); *B32B 27/20* (2013.01); *B32B 27/28* (2013.01); *B32B 27/32* (2013.01); *C08K 3/26* (2013.01); *B29C 66/8322* (2013.01); *B29C 66/919* (2013.01); *B29C 66/929* (2013.01); *B29C 66/939* (2013.01); *B29C 66/93451* (2013.01); *B29L 2031/74* (2013.01); *B32B 2250/03* (2013.01); *B32B 2262/02* (2013.01); *B32B 2262/0276* (2013.01); *B32B 2307/302* (2013.01); *B32B 2307/304* (2013.01); *B32B 2307/308* (2013.01); *B32B 2307/54* (2013.01); *B32B 2307/7145* (2013.01); *B32B 2307/734* (2013.01); *B32B 2307/752* (2013.01); *B32B 2398/20* (2013.01); *B32B 2439/00* (2013.01); *B32B 2439/40* (2013.01); *C08K 2003/2206* (2013.01); *C08K 2003/265* (2013.01)

(58) Field of Classification Search
CPC ............ B29C 66/742; B29C 66/74283; B65D 81/3823; B65D 81/3818; B65D 81/3216; B65D 81/3806; B65D 81/3846; C08K 3/18; F25D 3/08; F25D 3/06; F25D 2303/0844; F25D 2303/0845; F25D 2331/812; F25D 2331/803; F25D 2331/809; Y10S 220/912
USPC ....... 126/246, 400, 273.5, 263.06; 215/13.1; 220/592.27, 574.2, 215, 574, 592.17, 220/573.4, 62.11, 592.22, 23.88; 206/545
See application file for complete search history.

(56) References Cited

U.S. PATENT DOCUMENTS

| | | | | |
|---|---|---|---|---|
| 1,298,202 | A * | 3/1919 | Hall | A47J 39/00 220/23.87 |
| 1,555,399 | A * | 9/1925 | Bultman | A47J 39/02 215/13.1 |
| 1,639,529 | A * | 8/1927 | Payson | B65D 81/3846 215/13.1 |
| 1,684,399 | A * | 9/1928 | Lamb | B65D 81/3846 215/13.1 |
| 1,953,585 | A * | 4/1934 | Brown | A47J 41/0072 220/573.1 |
| 1,975,241 | A * | 10/1934 | Werber | A47J 41/0077 220/592.17 |
| 2,571,111 | A * | 10/1951 | Clark | A47J 37/015 99/347 |
| 3,094,448 | A * | 6/1963 | Cornelius | A47J 41/0077 156/292 |
| 3,120,570 | A * | 2/1964 | Kennedy | B29C 44/1247 138/109 |
| 3,225,954 | A * | 12/1965 | Christie | A47J 41/022 220/592.27 |
| 4,258,695 | A * | 3/1981 | McCarton | A47J 41/0044 126/246 |
| 4,356,926 | A * | 11/1982 | Priestly | B29C 66/742 156/73.1 |
| 5,052,369 | A * | 10/1991 | Johnson | A47G 19/2288 126/246 |
| 5,355,777 | A * | 10/1994 | Chen | A47J 39/00 206/545 |
| 5,596,921 | A * | 1/1997 | Kuwana | A47J 36/06 99/340 |
| 5,697,545 | A * | 12/1997 | Jennings | B23K 20/10 228/112.1 |
| 5,787,839 | A * | 8/1998 | Magnant | A01K 5/0114 119/51.5 |
| 5,904,264 | A * | 5/1999 | Yamada | A47J 41/0077 220/62.18 |
| 6,010,027 | A * | 1/2000 | Fujii | A47J 41/0072 220/574 |
| 6,152,319 | A * | 11/2000 | Kamachi | A47J 41/0077 220/592.2 |
| 7,378,625 | B2 * | 5/2008 | Richardson | B65D 15/14 219/730 |
| 8,772,685 | B2 * | 7/2014 | Backaert | A47J 27/04 219/682 |
| 2002/0008113 | A1* | 1/2002 | Fujii | B65D 81/3818 220/592.2 |
| 2002/0017526 | A1* | 2/2002 | Norio | B65D 43/022 220/592.2 |
| 2002/0130131 | A1* | 9/2002 | Zucker | B65D 81/18 220/592.2 |
| 2003/0146224 | A1* | 8/2003 | Fujii | A47J 41/022 220/592.27 |
| 2006/0196497 | A1* | 9/2006 | Dean | A47G 19/027 126/246 |
| 2007/0187469 | A1* | 8/2007 | Chen | B23K 20/122 228/112.1 |
| 2010/0233501 | A1* | 9/2010 | Messer | B23K 9/232 428/586 |
| 2014/0361020 | A1* | 12/2014 | Cheng | A47J 36/02 220/573.1 |
| 2016/0176614 | A1* | 6/2016 | Mittal | A47J 36/027 219/725 |
| 2018/0073532 | A1* | 3/2018 | Whalen | B23K 20/1265 |
| 2019/0126561 | A1* | 5/2019 | Whalen | B29C 65/0681 |

* cited by examiner

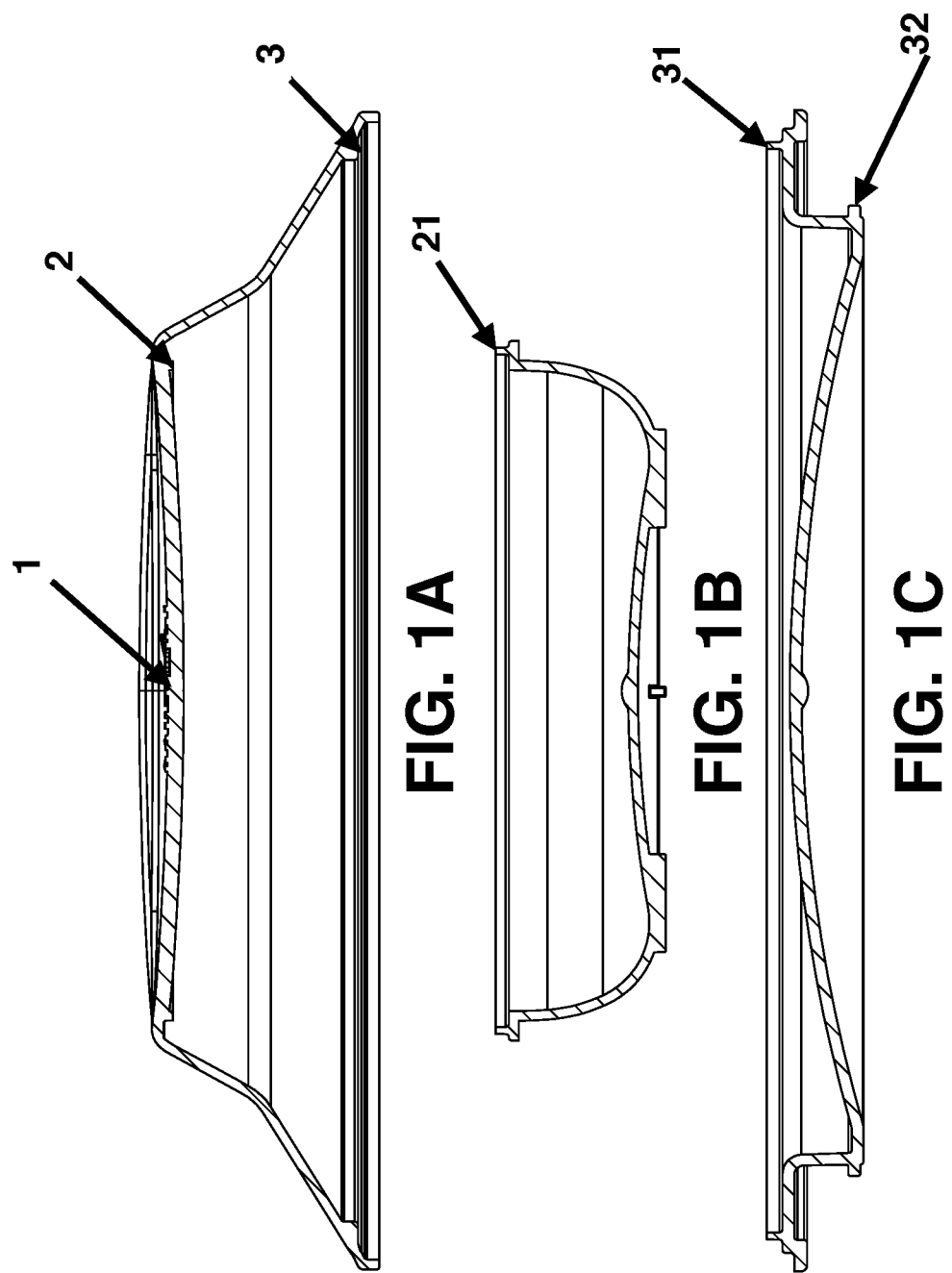

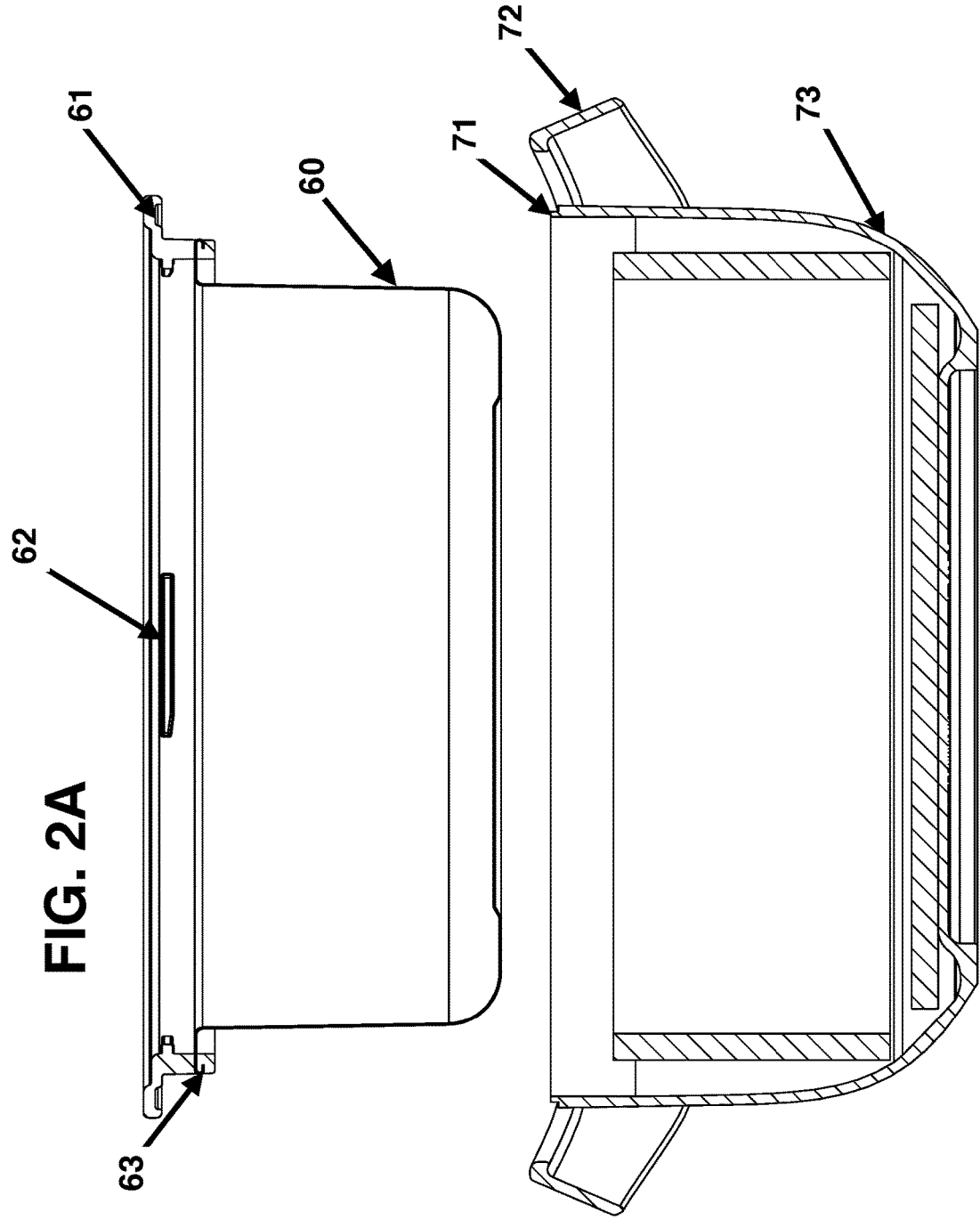

REHEATABLE AND WASHPROOF CONTAINER WITH INSULATION PROPERTIES

TECHNICAL FIELD OF INVENTION

The present invention generally relates to an insulated household utility container. The present invention more particularly relates to an insulated container having layered insulation cover to give absolute sealing to the layers from penetration of external matters.

BACKGROUND OF THE INVENTION

In conventional insulated containers, the method of assembling container's sub parts is simple mechanical push snap fit and the insulation used is non-recyclable and non-eco-friendly rigid PU foam, which makes it unsafe to be used in a microwave and dishwashing machines due to its expansion properties. The expansion of the insulation material on microwave exposure results in disassembling of the apparatus.

Also, while handling liquid food items in the conventional insulated container, liquid seeps in and between the layers and open curvatures of the containers surface and gets collected therein, which is difficult to clean due to inaccessible cleaning space. The accumulated food in such spaces gives unhygienic bad odor after use.

Hence, there is a need to develop a new kind of an insulated container with new assembly techniques to be used in dishwashers and with new insulation component to be used in microwave, made from recyclable material. The new container has been designed in such manner that liquid does not seep in the container, thus avoiding accidents such as electrical hazard and unhygienic conditions.

The above mentioned shortcomings, disadvantages and problems are addressed herein, as detailed below.

OBJECT OF INVENTION

The primary object of the present invention is to provide an insulated container to be used for reheating in heating devices such as microwave or device having similar mechanism after washing.

Another object of the present invention is to adopt a spin welding and an insert moulding technique for assembling the container's parts and subparts for absolute sealing of the layers.

Another object of the present invention is to implement recyclable & non-hazardous insulation material in said container which shall not have physical, chemical and/or constructional changes when exposed to the microwave radiation.

SUMMARY OF INVENTION

The various embodiments of the present invention provide a re-heatable and wash proof container with insulation properties. The container comprises a body assembly and a lid assembly. The body assembly comprises at-least three layers namely an outer plastic body, a middle layer and an inner stainless steel with treated (SS) container. The outer plastic layer is made up of polypropylene filled with 20% mineral. The middle layer is made up of a nonwoven polyester fabric. The inner stainless steel (SS) container is insert molded between a fused layer of plastic ring, the outer plastic body and the middle layer. The lid assembly comprises a plastic top lid, an inner lid and a bowl with nonwoven polyester fabric acting as an insulation wherein the top lid is radially fused with the inner lid and the bowl. An extended rib on the lid assembly is insert-ably locked in a corresponding rib on the plastic ring in the body assembly by rotating in clockwise direction.

According to one embodiment of the present invention, the non-woven polyester fabric in said body assembly is enclosed in between the outer plastic body and the inner SS container. The enclosure is completely sealed by fusing outer plastic body with the plastic ring. The plastic ring is placed on top of the outer plastic body and the middle layer by spin welding.

According to one embodiment of the present invention, the stainless steel (SS) container is inserted in between the outer plastic body and the middle layer by using insert moulding technique.

According to one embodiment of the present invention, the plastic top lid, the inner lid and the bowl are sealed by using a plastic to plastic fusion using the spin welding technique.

According to one embodiment of the present invention, the mineral comprises carbonate based filler.

According to one embodiment of the present invention, the body assembly sustains a temperature range of 40-50° C.

According to one embodiment of the present invention, the body assembly has a heat deflection temperature of 110° C.

According to one embodiment of the present invention, a fusion temperature has been maintained at a predetermined temperature, at least in between 135 to 155° C., to make the welding of the lid and body assembly absolutely leak proof.

According to one embodiment of the present invention, the spin welding technique is performed at a pre-determined pressure range, at least in between 1.5 to 4 Pressure Bar and variable spindle rotational speed at least in between 150 to 350 RPM to achieve the leak-proof assembly.

The embodiments herein provide the body assembly comprises of at least three layers. The outer layer consist of Polypropylene filled with 20% minerals to enhance the thermal stability of container when exposed to microwave or device having similar mechanism after washing, especially in a dishwashing machine where temperature reaches 70 degree and above. The middle layer which is an insulation layer consists of nonwoven polyester fabric, which acts as a thermal insulation between the inner and outer layer. The inner layer consists of treated Stainless Steel (J4). The lid assembly comprises of a plastic top lid, an inner lid and a bowl with nonwoven polyester fabric acting as insulation. The nonwoven polyester fabric is sandwiched between the plastic top lid, the inner lid and the bowl.

The Polypropylene filled with 20% minerals is used in the outer layer helps in maintaining thermal and dimensional stability of the container. The thermal and dimensional stability is essential for using spin welding technique to assemble the parts and subparts of the container and the fabric can sustain very high temperature, especially when used in microwave and dishwashing machine. The material has a tensile strength of >25 MPA and can sustain heat deflection temperature of 100 degrees Celsius with minimum shrinkage of 1.2 to 1.3% on strong exposure. Due to these particular properties, the material has been used in the present invention so that on microwave exposure there are no physical damages, deformation, distortion, weight gain or loss in the container and the parts and subparts are not disassembled due to expansion.

The middle layer consists of nonwoven polyester fabric mainly used for thermal insulation due to its ability and capacity to withstand high temperature upto 100 degree Celsius without causing any visual, physical and chemical damages to the material. The main objective of the insulation is to provide thermal high stability and lower thermal conductivity to the container. In order to achieve the end result, numerous insulation materials were tested with, such as expanded polyethylene, expanded polystyrene etc. However, these materials failed to achieve the desired result due to its non-compatibility with container's design. The nonwoven polyester fabric was found to possess the desired properties of higher thermal stability and lower thermal conductivity and was therefore found to be most suitable. The nonwoven polyester fabric insulation is available in fabric form, which can be cut and shaped as per the containers (products) requirement. The lowest thermal conductivity of the nonwoven polyester fabric is approximately 0.08 W/m-k, due to which the container efficiently retains heat of the food. The polyester fabric insulation overcomes the problem associated with the conventional insulation. The conventional insulation used in other insulated container is rigid polyurethane which is a hydrochloroflourocarbon based insulation commonly known to cause ozone depletion.

The inner layer consists of treated Stainless Steel J4 Grade. The Stainless Steel has better surface properties and is resistant to corrosion, chemicals and salts, primarily because of presence of chromium in the steel but not limited to it, as presence of other element such as molybdenum and nitrogen also increases corrosion resistivity.

The terminals/joints of the outer Polypropylene body, the middle layer and the inner plastic ring are spin welded to bring plastic-plastic fusion by creating mechanical friction between the plastic surface by application of predetermined force and energy to generate heat energy. The heat generated in the process forges the plastics and brings about their fusion. Also the plastic top lid, the inner lid and the bowl are joined together using the spin welding technique, so that both, the body assembly and the lid assembly becomes dishwasher safe. The insert moulding fusion technique is used only at the container's top to fuse the outer plastic body, top ring and inner SS layer. Due to insert moulding fusion, the inner SS layer and top ring cannot be manually separated from the main container in any manner, which completely eliminates the possibility of seepage of liquid between the layers of the containers. The polyester fabric is enclosed in between the outer plastic body and the inner SS container.

A plurality of factors are considered while implementing spin welding technique in plastic-plastic fusion such as material type, melting temperature, viscosity, bond strength etc. In addition to these factors, it is also important to consider process parameter such as frictional force, RPM etc. The application of Spin Welding gives high quality permanent joints to the container through plastic-plastic fusion to make the container absolutely sealed to avoid water seepage between the layers of the body during washing or seepage of liquid food while handling which is evident in the conventional containers. The major problem for assembling the containers part during spin welding was higher warpage and improper welding/fusion, which was possible to overcome by substituting virgin polypropylene with mineral filled polypropylene and modifying the product design by providing energy detector for accurate welding in the present invention.

Generally, the container cannot be heated without lid as the radiowave or microwave should directly impinge on food for proper heating and metals cannot be exposed to microwave. However, in this case, the food can be heated without lid wherein the stainless steel container is directly exposed to the microwave radiation. The food in the container remains hot for long period of time and the container can be again and again re-heated without any physical or chemical damages.

In one embodiment, the inner ring is insert moulded in to the SS Container. Insert moulding is an injection process in which part of the same or dissimilar material is assembled on to the other part. Lid gets locked in the lock provided in the ring. This lock has been designed to get engaged and disengaged by rotation on lid either in clockwise or anti-clockwise direction.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiment's herein without departing from the spirit thereof, and the embodiment's herein include all such modifications. These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiment's herein without departing from the spirit thereof, and the embodiment's herein include all such modifications.

BRIEF DESCRIPTION OF DRAWINGS

The other objects, features and advantages will occur to those skilled in the art from the following description of the preferred embodiment and the accompanying drawings in which:

FIG. 1A is the exploded view of the top lid of an insulated container lid assembly, according to one embodiment of the present invention.

FIG. 1B is the exploded view of the bowl of an insulated container lid assembly, according to one embodiment of the present invention.

FIG. 1C is the exploded view of the bottom lid of an insulated container lid assembly, according to one embodiment of the present invention.

FIG. 2A is the exploded view of the treated inner stainless steel container of an insulated container body assembly, according to one embodiment of the present invention.

FIG. 2B is the exploded view of the outer plastic body of an insulated container body assembly, according to one embodiment of the present invention is a sectional view of an insulated body assembly, according to one embodiment of the present invention.

DETAILED DESCRIPTION OF DRAWINGS

Figure 1:
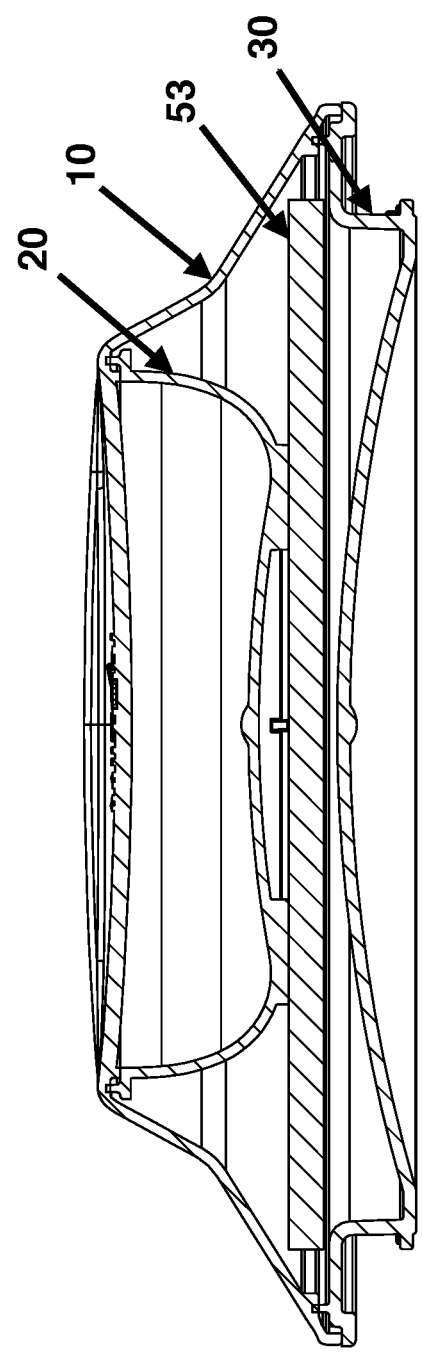
FIG. 1 is a sectional front view of an insulated container lid assembly, according to one embodiment of the present invention.
Figure 1D:
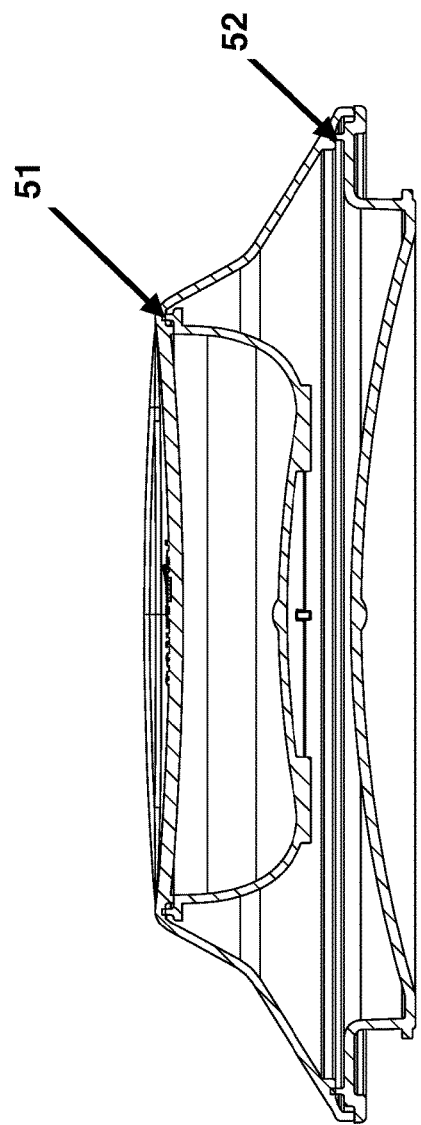
FIG. 1D illustrates points/joints where top lid, bowl, insulation material and bottom lid are sealed because of plastic to plastic fusion using spin welding technique, according to one embodiment of the present invention.

The various embodiments herein provide a re-heatable and washable container with insulation properties. The container comprises a body assembly (FIG.2) and a lid assembly (FIG.1). The body assembly comprises of at least three layer of an outer plastic body (73), an insulation middle layer (83) and an inner stainless steel (SS) container (60); Wherein the inner stainless steel is insert molded between plastic ring and the other two layers. The inner SS container is wrapped around by a fabric consisting of Polypropylene filled with 20% minerals and nonwoven polyester fabric acting as an insulation material. The nonwoven polyester fabric is enclosed in between the outer plastic body and the inner SS container and is completely sealed using spin welding technique owing to which the insulation material does not come in contact with water or air and the material's shelf life remains almost constant. The said Polypropylene filled with minerals provides high mechanical stiffness, thermal stability, and dimensional stability over wide range of the temperature to the product. The lid assembly comprises of a plastic top lid (10), an inner lid (30) and a bowl (20) with non-woven polyester fabric (53) acting as insulation. The nonwoven polyester fabric is sandwiched between the plastic top lid, the inner lid and the bowl and can withstand at least 100° C. temperature. In the body assembly, the outer plastic body and the inner plastic ring (63) is joined together using a spin welding technique. Also the plastic top lid, the inner lid and the bowl are joined together using the spin welding technique, so that both, the body assembly and the lid assembly becomes absolutely sealed to any particulates, liquids and is dishwasher safe and at the same time reheatable. The container lid is provided with an inbuilt handle (1) in the top lid and a projection in the inner lid for locking and unlocking of container lid with the container body.

The insulated container body according to the present invention comprises three main components. The three main components are a plastic outer body (73), insert molded inner ring (63) with SS container (60) and an insulation material (83) in between, assembled/joined using spin welding technique to bring plastic-plastic fusion to make the container absolutely sealed from external environment to avoid water seepage between the layers of the body during washing and avoiding unhygienic condition. The insulated container body is provided with a projection in the insert molded inner ring for locking and unlocking with the container lid. It also comprises of two side handles in the outer plastic body for the ease of handling the insulated container. The container lid and container body are designed to be able to lock and unlock easily and to avoid the slippage accidents. The container lid and the container body also have a good fitting which enhances the heat retention of the food. The Container body is capable of accommodating any kind of container lid made up of steel, plastic or glass which may or may not be insulated and may or may not be microwave and dishwasher safe.

Figure 2C:
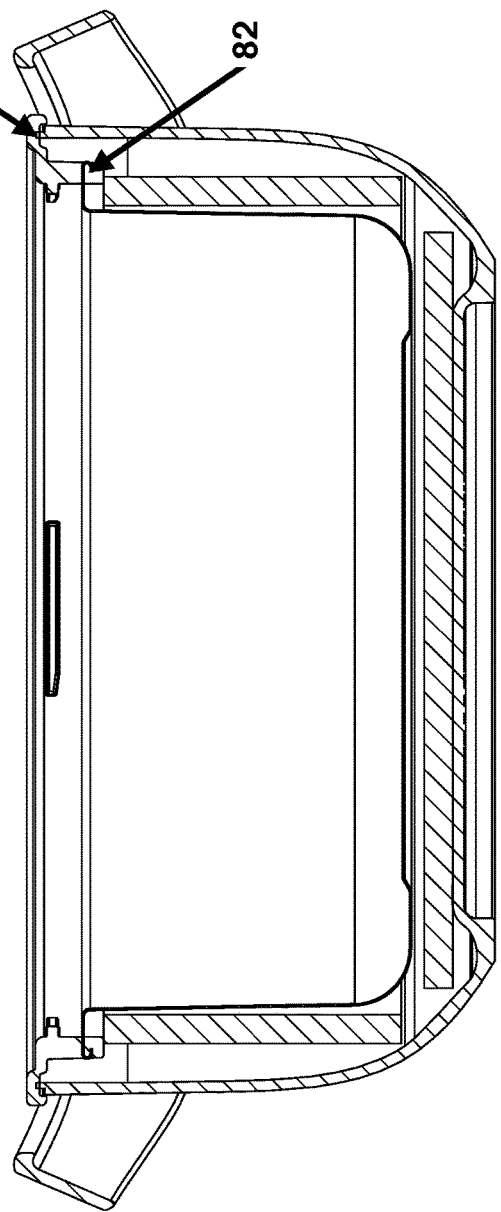
FIG. 2C illustrates points/joints where the outer plastic body, insulation material, treated inner stainless steel container and plastic top lid are sealed by using spin welding technique and insert moulding technique, according to one embodiment of the present invention.
Figure 2:
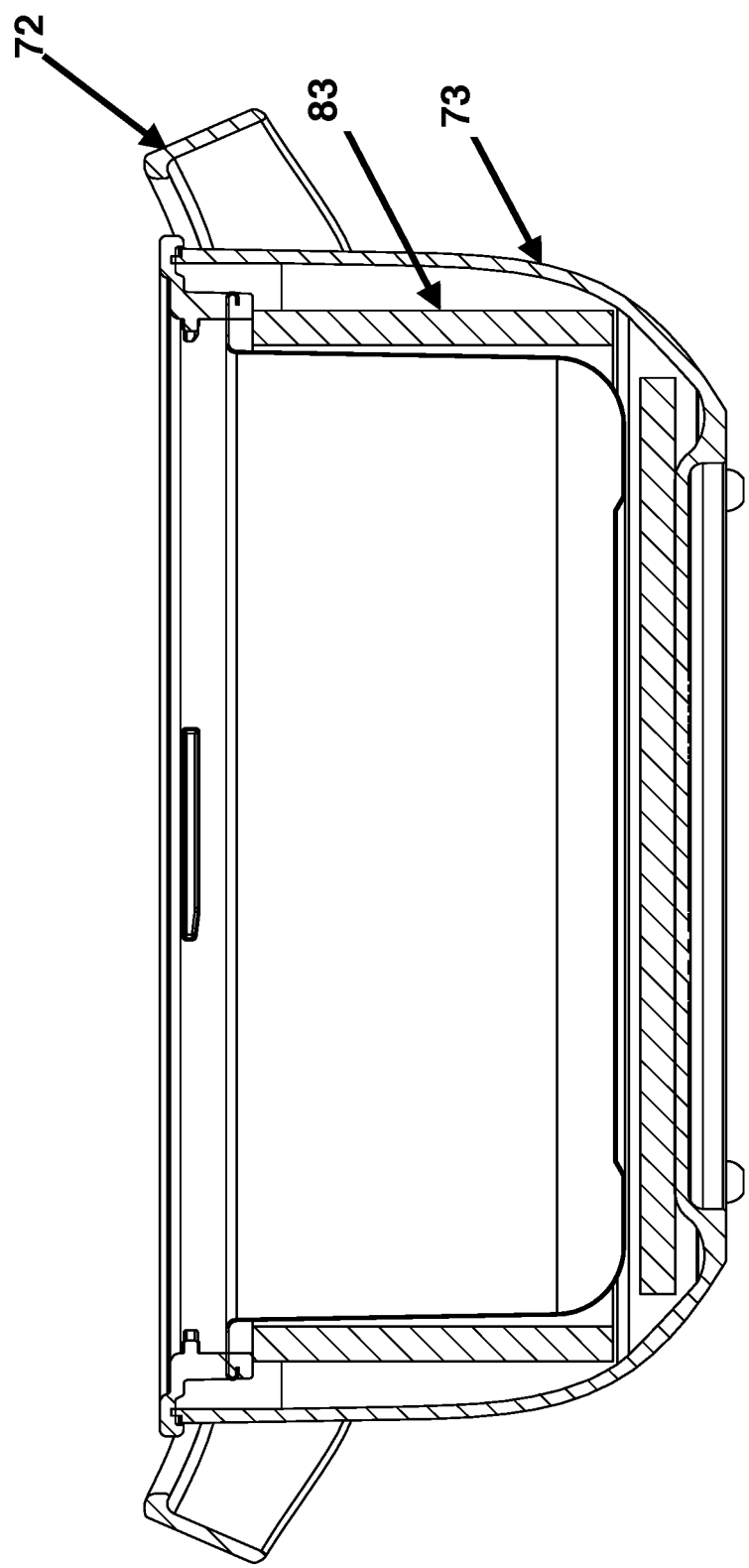
FIG. 2 is a sectional front view of an insulated container body assembly, according to one embodiment of the present invention.

FIG. 1 illustrates a sectional front view of an insulated container lid assembly and FIG. 2 illustrates a sectional front view of an insulated container body assembly. With respect to FIG. 1, the insulated container lid comprises a top lid (10), a bowl (20) and an inner lid (30). The inner lid (30) comprises a small extended rib (32) which insert-ably gets locked with rib (62) of the ring (63). The top lid (10) is welded with the bowl (20) at the location 2 in the top lid and (21) in the bowl with the spin welding technique. The top lid (10) has an inbuilt handle 1 for rotating the insulated lid for locking and unlocking purpose. The top lid (10) is welded with the inner lid (30) at the locations (3) in top lid and (31) in inner lid. The insert molded inner ring (63) is welded with plastic outer body (73) at locations (61) in insert molded ring (63) and (71) in plastic outer body (73).

With respect to FIG. 1), the insulation fabric (53) is placed in between the welded lid assembly of the top lid (10), the bowl (20) and the inner lid (30).

With respect to FIG. 2, the insulation fabric (83) is wrapped around the SS container of the insert molded ring (63) and is enclosed in between the welded assembly of the insert molded plastic ring (63) and outer body (73). An outer handle fitting (72) is molded into the outer body (73) to hold the casserole.

Experimental Data

The present invention passed the standard reliability test wherein the visual parameters were judged after each predetermined wash cycle for physical damages, deformation, distortion, weight gain or loss of the container etc after the container was washed with water having water temperature of 72-degree C for 110 minute using Cascade detergent and dried at a temperature of 60-degree C.

ADVANTAGE OF THE INVENTION

The conventional insulated containers are neither dish washer safe nor they can be used in microwave in technical sense. The present invention provides an insulated container designed and developed in such a way that along with existing function of keeping food warm for longer period of time, it has an added advantage of reheating stored food in a microwave oven, and can be cleaned in a dish-washing machine.

The welding/fusing of plastic-plastic is easier than the other material, since plastic requires low energy and force for assembling. The implementation of spin welding technique eliminates the seepage of water inside the container. The insert moulding of ring with SS container eliminates sharp edge, in turn avoids the arcing issues common in microwave use. The assembly technique makes the product more rigid than the conventional mechanical push/snap fits.

The conventional insulated container uses rigid PU as insulation material, which is non-recyclable, hazardous to environment and non-eco-friendly. The present invention uses non-woven polyester based fabric as an insulation medium, which is recyclable and nonhazardous to environment.

The spin welding technique requires advance machineries designed to suit this specific product application. The production and assembly process requires more time than the conventional products.

The invention claimed is:
1. A heat-resistant and washable container with insulation properties comprising:
 a body assembly comprising at least three layers:
  an outer plastic body made of polypropylene filled with at least 20% carbonate based mineral filler;
  a middle layer, wherein the middle layer is made up of a nonwoven polyester fabric; and an inner stainless steel container comprising a molded plastic ring near an upper portion of the inner stainless steel container;
said plastic ring further comprising a first rib;
wherein:
the outer plastic body is attached to the inner stainless steel container at the plastic ring and the middle layer is positioned between the inner stainless steel container and the outer plastic body; and
a lid assembly comprising:
a plastic top lid;
an inner lid comprising an extended rib;
a bowl; and
an insulation layer of nonwoven polyester fabric positioned between the top lid and the inner lid beneath the bowl;
wherein the top lid is fused to both the inner lid and the bowl; and
the extended rib of the inner lid releasably engages with the first rib of the plastic ring.

2. The container of claim 1, wherein the outer plastic body is fused to the plastic ring of the inner stainless steel container by spin welding, thereby completely enclosing the non-woven polyester fabric of the middle layer.

3. The container of claim 2, wherein the spin welding is performed at a pressure range between 1.5 to 4 bar and at a variable spindle rotational speed between 150 to 350 RPM to achieve a leak proof connection.

4. The container of claim 1, wherein the inner stainless steel container is attached to the molded plastic ring by insert molding.

5. The container of claim 1, wherein the plastic top lid, the inner lid, and the bowl are sealed together by spin welding.

6. The container of claim 1, wherein the carbonate based mineral filler comprises calcium carbonate.

7. The container of claim 1, wherein the body assembly is capable of sustaining a temperature range between 40-50° C.

8. The container of claim 1, wherein the body assembly has a heat deflection temperature of 110° C.

9. The container of claim 1, wherein the lid assembly is fused together by leak proof welding at temperatures between 135-155° C.

* * * * *